(12) United States Patent
Koseoglu

(10) Patent No.: US 11,174,441 B2
(45) Date of Patent: Nov. 16, 2021

(54) DEMETALLIZATION BY DELAYED COKING AND GAS PHASE OXIDATIVE DESULFURIZATION OF DEMETALLIZED RESIDUAL OIL

(71) Applicant: SAUDI ARABIAN OIL COMPANY, Dhahran (SA)

(72) Inventor: Omer Refa Koseoglu, Dhahran (SA)

(*) Notice: Subject to any disclaimer, the term of this patent is extended or adjusted under 35 U.S.C. 154(b) by 0 days.

(21) Appl. No.: 16/166,686

(22) Filed: Oct. 22, 2018

(65) Prior Publication Data

US 2020/0123452 A1    Apr. 23, 2020

(51) Int. Cl.
| | |
|---|---|
| C10G 55/04 | (2006.01) |
| C10G 67/12 | (2006.01) |
| C10G 27/04 | (2006.01) |
| C01B 3/34 | (2006.01) |
| C10G 9/00 | (2006.01) |

(52) U.S. Cl.
CPC .............. *C10G 55/04* (2013.01); *C01B 3/34* (2013.01); *C10G 9/005* (2013.01); *C10G 27/04* (2013.01); *C10G 67/12* (2013.01); *C10G 2300/107* (2013.01); *C10G 2300/1048* (2013.01); *C10G 2300/202* (2013.01); *C10G 2300/205* (2013.01); *C10G 2300/708* (2013.01)

(58) Field of Classification Search
CPC ........ C10G 9/005; C10G 27/00; C10G 27/04; C10G 55/04; C10G 57/00; C10G 67/12; C10G 69/06
See application file for complete search history.

(56) References Cited

U.S. PATENT DOCUMENTS

| | | | |
|---|---|---|---|
| 2,640,010 | A | 5/1953 | Hoover |
| 2,749,284 | A | 6/1956 | Noble et al. |
| 3,341,448 | A | 9/1967 | Adlington et al. |
| 3,617,481 | A | 11/1971 | Voorhies, Jr. et al. |
| 3,945,914 | A | 3/1976 | Yoo et al. |
| 4,058,451 | A | 11/1977 | Stolfa |
| 4,481,101 | A | 11/1984 | Yan |
| 4,596,782 | A | 6/1986 | Courty et al. |
| 5,045,177 | A | 9/1991 | Cooper |
| 5,753,102 | A | 5/1998 | Funakoshi et al. |
| 5,824,207 | A | 10/1998 | Lyapin et al. |
| 5,910,440 | A | 6/1999 | Grossman et al. |
| 5,969,191 | A | 10/1999 | Wachs |
| 7,749,376 | B2 | 7/2010 | Turbeville |
| 8,906,227 | B2 | 12/2014 | Bourane et al. |
| 8,920,655 | B2 | 12/2014 | Bourane et al. |

(Continued)

FOREIGN PATENT DOCUMENTS

| | | |
|---|---|---|
| WO | 2005116169 A1 | 12/2005 |
| WO | 2017120130 A1 | 7/2017 |
| WO | 2018022596 A1 | 2/2018 |

OTHER PUBLICATIONS

Choudhary, et al., "Towards Clean Fuels: Molecular-Level Sulfur Reactivity in Heavy Oils," Chem. Int. Ed., 45, 3299-3303 (2006).

(Continued)

*Primary Examiner* — Renee Robinson
(74) *Attorney, Agent, or Firm* — Abelman, Frayne & Schwab; Stefan Knirr; Norman Hanson

(57) ABSTRACT

The invention is an integrated process for treating residual oil of a hydrocarbon feedstock. The oil is first subjected to delayed coking and then oxidative desulfurization. Additional, optional steps including hydrodesulfurization, and hydrocracking, may also be incorporated in to the integrated process.

16 Claims, 2 Drawing Sheets

(56) References Cited

U.S. PATENT DOCUMENTS

| | | | |
|---|---|---|---|
| 9,062,259 B2 | 6/2015 | Koseoglu et al. | |
| 9,464,241 B2 | 10/2016 | Koseoglu et al. | |
| 9,574,142 B2 | 2/2017 | Bourane et al. | |
| 9,574,143 B2 | 2/2017 | Bourane et al. | |
| 9,574,144 B2 | 2/2017 | Bourane et al. | |
| 9,598,647 B2 | 3/2017 | Bourane et al. | |
| 9,663,725 B2 | 5/2017 | Bourane et al. | |
| 2003/0094400 A1* | 5/2003 | Levy | C10G 67/12 208/222 |
| 2011/0083996 A1* | 4/2011 | Shafi | C10G 69/06 208/50 |
| 2013/0026069 A1* | 1/2013 | Koseoglu | C10B 55/00 208/87 |
| 2013/0028822 A1* | 1/2013 | Bourane | B01J 37/031 423/244.06 |
| 2013/0334103 A1* | 12/2013 | Bourane | C10G 21/28 208/236 |
| 2017/0058202 A1* | 3/2017 | Noureldin | C10B 57/00 |
| 2017/0190841 A1 | 7/2017 | Koseoglu et al. | |
| 2018/0029023 A1 | 2/2018 | Koseoglu et al. | |

OTHER PUBLICATIONS

Choi, et al., "Selective Oxidesulfurization Iof C1-Organosulfur Compounds over Supported Metal Oxide Catalysts," Am. Chem. Soc. Div. of Fuel Chem., 47(1): 138-139 (2002).

Choi, et al., "Vapor-Phase Oxidesulfurization (ODS) of Organosulfur Compounds: Carbonyl Sulfide, Methyl Mercaptans and Thiophene," Am. Chem. Soc. Div. of Fuel Chem., 49(2):514-515 (2004).

Gao, et al., "Hydrotalcite-like Compounds Derived CuZnAl Oxide Catalysts for Aerobic Oxidative Removal of Gasoline-Range Organosulfur Compounds," Energy & Fuels, 23:624-630 (2009).

Hua, et al., "Determination of sulfur-containing compounds in diesel oils by comprehensive two-dimensional gas chromatography with a sulfur chemiluminescence detector," Journal of Chromatography A, 1019:101-109 (2003).

Hughey, et al., "Resolution of 11 000 Compositionally Distinct Components in a Single Electrospray Ionization Fourier Transofrm Ion Cyclotron Resonance Mass Spectrum of Crude Oil," Anal. Chem., 74, 4145-4149 (2002).

Muller, et al., "Characterization of High-Molecular-Weight Sulfur-Containing Aromatics in Vacuum Residues Using Fourier Transofrm Ion Cyclotron Resonance Mass Spectrometry," Anal. Chem., 77:2536-25431 (2005).

Otsuki, et al., "Oxidative Desulfurization of Light Gas Oil and Vacuum Gas Oil by Oxidation and Solvent Extraction," Energy & Fuels, 14:1232-1239 (2000).

Sampanthar, et al., "A novel oxidative desulfurization process to remove refracxtory sulfur compounds from diesel fuel," Applied Catalysis B: Environmental, 63(1-2):85-93 (2006).

Steiner, et al., "Catalytic hydrodesulfurization of a light gas oil over a NiMo catalyst: kinetics of selected sulfur components," Fuel Processing Technology, 79:1-12 (2002).

Wu, et al., "Desulfurization of Gaseous Fuels Using Activated Carbons as Catalysts for the Selective Oxsidation of Hydrogen Sulfide," Energy and Fuels, 19(5): 1774-1782 (2005).

Yu, et al., "Oxidative Desulfurization of Diesel Fuels with Hydrogen Peroxide in the Presence of Activated Carbon and Formic Acid," Energy & Fuels, 19(2):447-452 (2005).

* cited by examiner

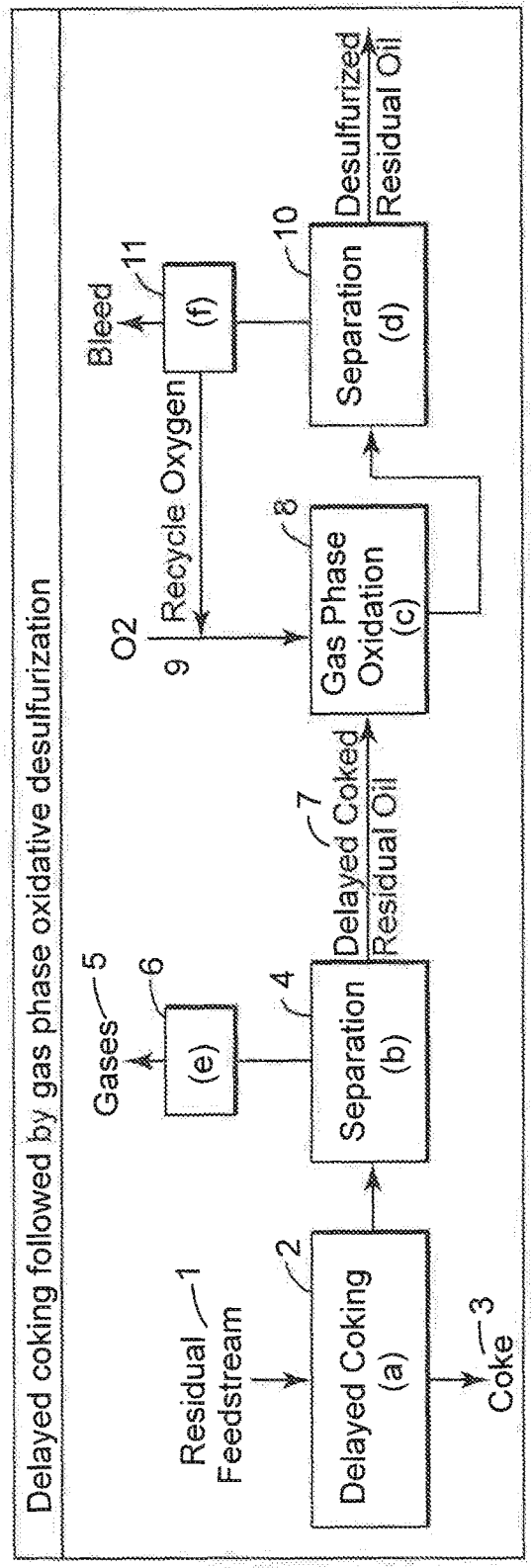
FIG. 1 Delayed coking followed by gas phase oxidative desulfurization
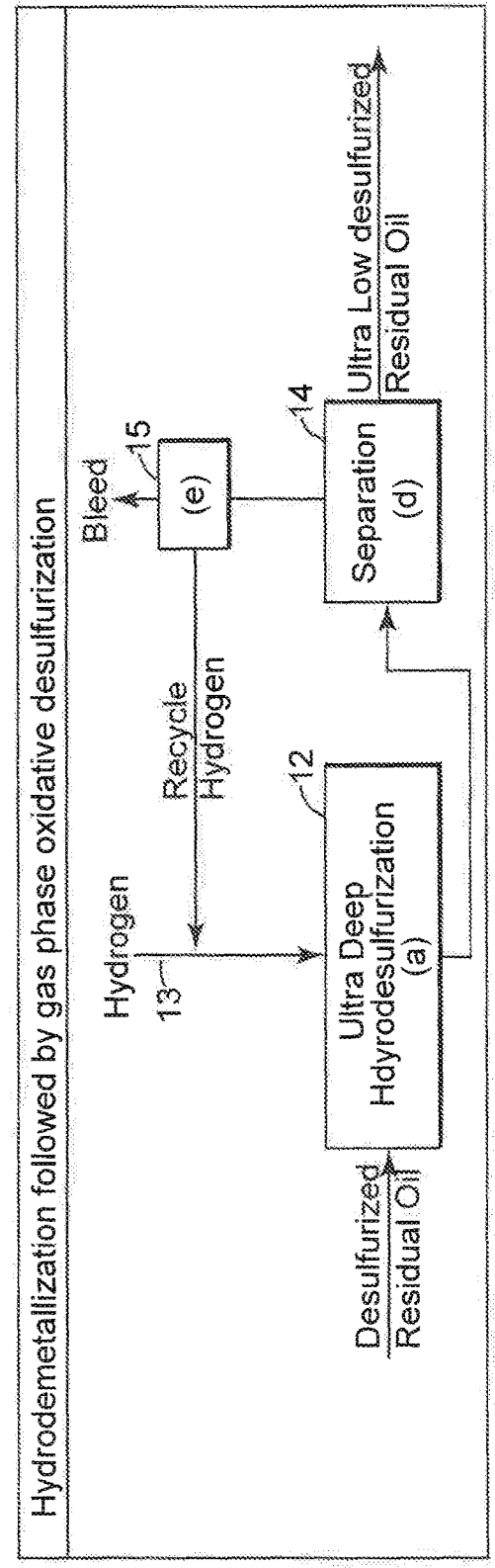
FIG. 2 Hydrodemetallization followed by gas phase oxidative desulfurization

DEMETALLIZATION BY DELAYED COKING AND GAS PHASE OXIDATIVE DESULFURIZATION OF DEMETALLIZED RESIDUAL OIL

FIELD OF THE INVENTION

The invention relates to an integrated process for treating a hydrocarbon feed, such as residual oil, involving the integration of delayed coking and oxidative desulfurization. Additional steps including hydrocracking and hydrodesulfurization (HDS) may also be used in concert with the integrated process.

BACKGROUND AND PRIOR ART

The discharge into the atmosphere of sulfur compounds during processing and end-use of petroleum products derived from sulfur-containing hydrocarbons, such as sour crude oil, poses health and environmental problems. As a result, strict new requirements for sulfur content of, e.g., fuel oils, have been introduced. These stringent, reduced sulfur specifications applicable to transportation and other fuel products have impacted the refining industry, and it is necessary for refiners to make capital investments to greatly reduce the sulfur content in products, such as gas oils to 10 parts per million by weight (ppmw) or less. In industrialized nations such as the United States, Japan and the countries of the European Union, refineries are already required to produce environmentally clean transportation fuels. For instance, since 2007, the United States Environmental Protection Agency has required that the sulfur content of highway diesel fuel be reduced by 97%, from 500 ppmw (low sulfur diesel) to 15 ppmw (ultra-low sulfur diesel). The European Union has enacted even more stringent standards, requiring diesel and gasoline fuels to contain less than 10 ppmw of sulfur. Other countries are following in the footsteps of the United States and the European Union and are moving forward with regulations that will require refineries to produce transportation fuels with an ultra-low sulfur level.

To keep pace with recent trends toward production of ultra-low sulfur fuels, refiners must choose among processes or raw materials, such as oils which provide flexibility so that future specifications can be met with minimum additional capital investment, preferably, by utilizing existing equipment. Technologies such as hydrocracking and two-stage hydrotreating offer solutions to refiners for the production of clean transportation fuels. These technologies are available and can be applied as new grassroots production facilities are constructed.

There are still many hydrotreating units installed worldwide which produce transportation fuels containing 500-3000 ppmw sulfur. These units were designed for, and are being operated at, relatively milder conditions (e.g., low hydrogen partial pressures of 30 kilograms per square centimeter for straight run gas oils boiling in the range of 180° C.-370° C.). Retrofitting is typically required to upgrade these existing facilities to meet the more stringent environmental sulfur specifications for transportation fuels mentioned supra. However, because of the comparatively more severe operational requirements (i.e., higher temperature and pressure) needed to obtain clean fuel production, retrofitting can raise substantial issues. Retrofitting can include one or more of integration of new reactors, hydrogen partial pressure, reengineering the internal configuration and components of reactors, utilization of more active catalyst compositions, installation of improved reactor components to enhance liquid-solid contact, increase of reactor volume, and an increase of feedstock quality.

Sulfur-containing compounds that are typically present in hydrocarbon fuels include aliphatic molecules such as sulfides, disulfides and mercaptans, as well as aromatic molecules such as thiophene, benzothiophene and its long chain alkylated derivatives, and dibenzothiophene and its alkyl derivatives such as 4,6-dimethyldibenzothiophene. Aromatic sulfur-containing molecules have a higher boiling point than aliphatic sulfur-containing molecules, and are consequently more abundant in higher boiling fractions. For example, certain fractions of gas oils possess different properties. Table 1 illustrates the properties of light and heavy gas oils derived from Arabian light crude oil:

TABLE 1

Composition of light and heavy gas oil fractions

| Feedstock Name | | Light | Heavy |
|---|---|---|---|
| Blending Ratio | | — | — |
| API Gravity | ° | 37.5 | 30.5 |
| Carbon | W % | 85.99 | 85.89 |
| Hydrogen | W % | 13.07 | 12.62 |
| Sulfur | W % | 0.95 | 1.65 |
| Nitrogen | ppmw | 42 | 225 |
| ASTM D86 Distillation | | | |
| IBP/5 V % | ° C. | 189/228 | 147/244 |
| 10/30 V % | ° C. | 232/258 | 276/321 |
| 50/70 V % | ° C. | 276/296 | 349/373 |
| 85/90 V % | ° C. | 319/330 | 392/398 |
| 95 V % | ° C. | 347 | |
| Sulfur Speciation | | | |
| Organosulfur Compounds Boiling Less than 310° C. | ppmw | 4591 | 3923 |
| Dibenzothiophenes | ppmw | 1041 | 2256 |
| $C_1$-Dibenzothiophenes | ppmw | 1441 | 2239 |
| $C_2$-Dibenzothiophenes | ppmw | 1325 | 2712 |
| $C_3$-Dibenzothiophenes | ppmw | 1104 | 5370 |

As seen in Table 1, the light and heavy gas oil fractions have ASTM (American Society for Testing and Materials) D86 85V % points of 319° C. and 392° C., respectively. Further, the light gas oil fraction contains less sulfur and nitrogen than the heavy gas oil fraction (0.95 W % sulfur as compared to 1.65 W % sulfur and 42 ppmw nitrogen as compared to 225 ppmw nitrogen).

It is known that middle distillate cuts, which boil in the range of 170° C.-400° C. contain sulfur species, such as but not limited to, thiols, sulfides, disulfides, thiophenes, benzothiophenes, dibenzothiophenes, and benzonaphthothiophenes, with and without alkyl substituents. (Hua, et al., "Determination of Sulfur-containing Compounds in Diesel Oils by Comprehensive Two-Dimensional Gas Chromatography with a Sulfur Chemiluminescence Detector," Journal of Chromatography A, 1019 (2003) pp. 101-109). The sulfur specification and content of light and heavy gas oils are conventionally analyzed by two methods. In the first method, sulfur species are categorized based on structural groups. The structural groups include one group having sulfur-containing compounds boiling at less than 310° C., including dibenzothiophenes and its alkylated isomers, and another group including 1, 2 and 3 methyl-substituted dibenzothiophenes, denoted as $C_1$, $C_2$ and $C_3$, respectively. Based on this method, the heavy gas oil fraction contains more alkylated di-benzothiophene molecules than the light gas oils.

Aliphatic sulfur-containing compounds are more easily desulfurized (labile) using conventional hydrodesulfurization methods. However, certain highly branched aliphatic molecules are refractory in that they can hinder sulfur atom removal and are moderately more difficult to desulfurize using conventional hydrodesulfurization methods.

Among the sulfur-containing aromatic compounds, thiophenes and benzothiophenes are relatively easy to hydrodesulfurize. The addition of alkyl groups to the ring compounds increases the difficulty of hydrodesulfurization. Dibenzothiophenes resulting from addition of another ring to the benzothiophene family are even more difficult to desulfurize, and the difficulty varies greatly according to their alkyl substitution, with di-beta substitution being the most difficult type of structure to desulfurize, thus justifying their "refractory" appellation. These beta substituents hinder exposure of the heteroatom to the active site on the catalyst.

Economical removal of refractory sulfur-containing compounds is therefore exceedingly difficult to achieve and, accordingly, removal of sulfur-containing compounds in hydrocarbon fuels to achieve an ultra-low sulfur level is very costly using current hydrotreating techniques. When previous regulations permitted sulfur levels up to 500 ppmw, there was little need or incentive to desulfurize beyond the capabilities of conventional hydrodesulfurization, and hence the refractory sulfur-containing compounds were not targeted. However, in order to meet the more stringent sulfur specifications, these refractory sulfur-containing compounds must be substantially removed from hydrocarbon fuels streams.

Relative reactivities of sulfur-containing compounds based on their first order reaction rates at 250° C. and 300° C. and 40.7 Kg/cm² hydrogen partial pressure over Ni—Mo/alumina catalyst, and activation energies, are given in Table 2 (Steiner P. and Blekkan E. A., "Catalytic Hydrodesulfurization of a Light Gas Oil over a NiMo Catalyst: Kinetics of Selected Sulfur Components," *Fuel Processing Technology*, 79 (2002) pp. 1-12).

As is apparent from Table 2, dibenzothiophene is 57 times more reactive than the refractory 4, 6-dimethyldibenzothiophene at 250° C. Although not shown, the relative reactivity decreases with increasing operating severity. With a 50° C. temperature increase, the relative reactivity of di-benzothiophene compared to 4, 6-dibenzothiophene decreases to 7.3 from 57.7.

The development of non-catalytic processes for desulfurization of petroleum distillate feedstocks has been widely studied, and certain conventional approaches based on oxidation of sulfur-containing compounds are described, e.g., in U.S. Pat. Nos. 5,910,440; 5,824,207; 5,753,102; 3,341,448 and 2,749,284, all of which are incorporated by reference.

Liquid phase oxidative desulfurization (ODS) as applied to middle distillates is attractive for several reasons. First, mild reaction conditions, e.g., temperature from room temperature up to 200° C. and pressure from 1 up to 15 atmospheres, are normally used, thereby resulting in reasonable investment and operational costs, especially for hydrogen consumption, which is usually expensive. Another attractive aspect is related to the reactivity of high aromatic sulfur-containing species. This is evident since the high electron density at the sulfur atom caused by the attached electron-rich aromatic rings, which is further increased with the presence of additional alkyl groups on the aromatic rings, will favor its electrophilic attack as shown in Table 3 (Otsuki, et al., "Oxidative desulfurization of light gas oil and vacuum gas oil by oxidation and solvent extraction," *Energy & Fuels*, 14 (2000) pp. 1232-1239). However, the intrinsic reactivity of molecules such as 4, 6-DMDBT should be substantially higher than that of dibenzothiophene (DBT), which is much easier to desulfurize by hydrodesulfurization.

TABLE 2

Hydrodesulfurization reactivity of dibenzothiophene and its derivativaties

| Name | Dibenzothlophene | 4-methyl-dibenzo-thiophene | 4,6-dimethyl-dibenzo-thiophene |
|---|---|---|---|
| Structure | 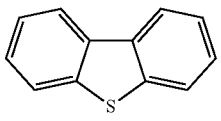 [SMILES: c1ccc2c(c1)sc1ccccc12] | 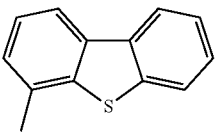 | 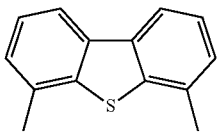 |
| Reactivity $k_{@250}$, $s^{-1}$ | 57.7 | 10.4 | 1.0 |
| Reactivity $k_{@300}$, $s^{-1}$ | 7.3 | 2.5 | 1.0 |
| Activation Energy $E_a$, Kcal/mol | 28.7 | 36.1 | 53.0 |

TABLE 3

Electron Density of selected sulfur species

| Sulfur compound | Formulas | Electron Density | K (L/(mol.min)) |
|---|---|---|---|
| Thiophenol | C6H5-SH | 5.902 | 0.270 |
| Methyl Phenyl Sulfide | C6H5-S-CH3 | 5.915 | 0.295 |
| Diphenyl Sulfide | (C6H5)2S | 5.860 | 0.156 |
| 4,6-DMDBT | | 5.760 | 0.0767 |
| 4-MDBT | | 5.759 | 0.0627 |
| Dibenzothiophene | | 5.758 | 0.0460 |
| Benzothiophene | | 5.739 | 0.00574 |
| 2,5-Dimethylthiophene | | 5.716 | — |
| 2-methylthiophene | | 5.706 | — |
| Thiophene | | 5.696 | — |

Recently, the use of cobalt and manganese based catalysts in air based oxidation of DBT type aromatic sulfur compounds into polar sulfones and/or sulfoxides has been described. A wide number of transition metal oxides, including $MnO_2$, $Cr_2O_3$, $V_2O_5$, NiO, $MoO_3$ and $Co_3O_4$, as well as transition metal containing compounds such as chromates, vanadates, manganates, rhenates, molybdates and niobates are described, but the most active and selective compounds were manganese and cobalt oxides. It was shown that the manganese or cobalt oxides containing catalysts provided 80% oxidation conversion of DBT at 120° C. One advantage of these catalysts is that the treatment of fuel takes place in the liquid phase. The general reaction scheme for the ODS process suggested is as follows: sulfur compound R—S—R' is oxidized to sulfone R—$SO_2$—R', and the latter can decompose with heating, to liberate $SO_2$ and R—R', while leaving behind hydrocarbon compounds that can be utilized in various ways. A recommended temperature for the reaction is from 90° C. to 250° C. See, e.g., PCT Application No. WO 2005/116169.

High catalytic activity of manganese and cobalt oxides supported on $Al_2O_3$ in oxidation of sulfur compounds at 130° C.-200° C. and atmospheric pressure has been described by Sampanthar, et al., "A Novel Oxidative Desulfurization Process to Remove Refractory Sulfur Compounds from Diesel Fuel," *Applied Catalysis B: Environmental*, 63(1-2), 2006, pp. 85-93. The authors show that, after the subsequent extraction of the oxidation products with a polar solvent, the sulfur content in the fuel decreased to 40-60 ppmw. Thiophene conversion increased with time and it reached its maximum conversion of 80-90% in 8 hours. It was shown that the trisubstituted dibenzothiophene compounds were easier to be oxidized than the monosubstituted dibenzothiophenes. The oxidative reactivity of S-compounds in diesel follows the order: trialkylsubstituted dibenzothiophene>dialkyl-substituted dibenzothiophene>monoalkyl-substituted dibenzothiophene>dibenzothiophene. These results showed that the most refractory sulfur compounds in the diesel hydrodesulfurization were more reactive in the oxidative desulfurization of fuel.

U.S. Pat. No. 5,969,191, incorporated by reference, describes a catalytic thermochemical process. A key catalytic reaction step in the thermochemical process scheme is the selective catalytic oxidation of organosulfur compounds (e.g., mercaptan) to a valuable chemical intermediate (e.g., $CH_3SH + 2O_2 \rightarrow H_2CO + SO_2 + H_2O$) over certain supported (mono-layered) metal oxide catalysts. The preferred catalyst employed in this process consists of a specially engineered $V_2O_5/TiO_2$ catalyst that minimizes the adverse effects of heat and mass transfer limitations that can result in the over oxidation of the desired $H_2CO$ to $CO_x$ and $H_2O$.

The process described later in U.S. Pat. No. 7,374,466, incorporated by reference, involves contacting of heterocyclic sulfur compounds in a hydrocarbon stream, e.g., in a petroleum feedstock or petroleum product, in the gas phase, in the presence of oxygen with a supported metal oxide catalyst, or with a bulk metal oxide catalyst to convert at least a portion of the heterocyclic sulfur compounds to sulfur dioxide and to useful oxygenated products, as well as sulfur-deficient hydrocarbons, and separately recovering the oxygenated products from a hydrocarbon stream with substantially reduced sulfur. The catalytic metal oxide layer supported by the metal oxide support is based on a metal selected from Ti, Zr, Mo, Re, V, Cr, W, Mn, Nb, Ta, and mixtures thereof. Generally, a support of titania, zirconia, ceria, niobia, tin oxide or a mixture of two or more of these is preferred. Bulk metal oxide catalysts based on molybdenum, chromium and vanadium can be also used. Sulfur content in fuel could be less than about 30-100 ppmw. The optimum space velocity likely will be maintained below 4800 V/V/hr and temperature will be 50° C.-200° C.

The vapor-phase oxidative desulfurization of various sulfur compounds (such as: COS, or $CS_2$, $CH_3SH$, $CH_3SCH_3$, $CH_3SSCH_3$, thiophene and 2,5-dimethylthiophene) by use of sulfur-tolerant $V_2O_5$-containing catalysts on different supports has been taught by Choi, S., et al., "Selective Oxidesulfurization of C1-Organosulfur Compounds over Supported Metal Oxide Catalysts," Preprints of Symposia—American Chemical Society, Division of Fuel Chemistry, 47(1):138-139 (2002) and Choi S., et al., "Vapor-phase Oxidesulfurization (ODS) of Organosulfur Compounds: Carbonyl Sulfide, Methyl Mercaptans and Thiophene," Preprints of Symposia—American Chemical Society, Division of Fuel Chemistry, 49(2):514-515 (2004). In these papers, the feed gas contained 1000 ppmw of COS, or $CS_2$, $CH_3SH$, $CH_3SCH_3$, $CH_3SSCH_3$, thiophene and 2,5-dimethylthiophene, 18% $O_2$ in He balance. The formed products (formalin, CO, $H_2$, maleic anhydride and $SO_2$) were monitored by temperature programmed surface reaction mass spectrometry. It was shown that the turnover frequency for COS and $CS_2$ oxidation varied by about one order of magnitude depending on the support, in the order $CeO_2 > ZrO_2 > TiO_2 > Nb_2O_5 > Al_2O_3 - SiO_2$.

A common catalyst for oxidative desulfurization is activated carbon (Yu, et al., "Oxidative Desulfurization of Diesel Fuels with Hydrogen Peroxide in the Presence of Activated Carbon and Formic Acid," *Energy & Fuels*, 19(2) pp. 447-452 (2005); Wu, et al., "Desulfurization of gaseous fuels using activated carbons as catalysts for the selective oxidation of hydrogen sulfide." *Energy and Fuels*, 19(5) pp. 1774-1782 (2005)). The application of this method allows removal of hydrogen sulfide from gaseous fuels at 150° C. by oxidation with air (Wu, 2005) and also sulfur removal from diesel fuels using hydrogen peroxide (Yu, 2005). The higher adsorption capacity of the carbon, the higher its activity in the oxidation of dibenzothiophene.

Various catalytic desulfurization processes are known. See, e.g., U.S. Patents Turbeville, et al. U.S. Pat. No. 7,749,376, Courty, et al. U.S. Pat. No. 4,596,782, Yoo, et al. 3,945,914, and Hoover, et al. 2,640,010, all of which are incorporated by reference.

Nonetheless, demand remains for additional efficient and effective process and apparatus for desulfurization of hydrocarbon fuels to an ultra-low sulfur level.

U.S. Pat. Nos. 8,920,635 and 8,906,227 describe gas phase oxidative desulfurization processes for gas oils over an oxidation catalyst. However, these patents do not teach demetallization or desulfurization of residual oil.

Unlike light crude oil fractions, heavy crude oil fractions contain metals in part per million quantities, which originate from crude oil. Crude oil contains heteroatom contaminants such as nickel, vanadium, sulfur, nitrogen, and others in quantities that can adversely impact the refinery processing of the crude oil fractions, e.g., by poisoning catalysts. Light crude oils or condensates contain such contaminants in concentrations as low as 0.01 W %. In contrast, heavy crude oils contain as much as 5-6 W %. The nitrogen content of crude oils can range from 0.001-1.0 W %. The heteroatom content of typical Arabian crude oils are listed in Table 4 from which it can be seen that the heteroatom content of the crude oils within the same family increases with decreasing API gravity, or increasing heaviness.

TABLE 4

Composition and properties of various crude oils

| Property | ASL* | AEL* | AL* | AM* | AH* |
|---|---|---|---|---|---|
| Gravity, ° | 51.4 | 39.5 | 33 | 31.1 | 27.6 |
| Sulfur, W % | 0.05 | 1.07 | 1.83 | 2.42 | 2.94 |
| Nitrogen, ppmw | 70 | 446 | 1064 | 1417 | 1651 |
| RCR, W % | 0.51 | 1.72 | 3.87 | 5.27 | 7.62 |
| Ni + V, ppmw | <0.1 | 2.9 | 21 | 34 | 67 |

*ASL—Arab Super Light; AEL—Arab Extra Light; AL—Arab Light; AM—Arab Medium and AH—Arab Heavy;
W % is percent by weight;
ppmw is parts per million by weight.

These crude oil data were further analyzed, and the metal distribution of various cuts were determined. Table 5 illustrates the metal distribution of the Arab light crude oil fractions.

TABLE 5

Metal distribution of Arab light crude oil

| Fraction | Vanadium, ppmw | Nickel, ppmw |
|---|---|---|
| 204° C.+ | 18 | 5 |
| 260° C.+ | 19 | 5 |
| 316° C.+ | 30 | 9 |

TABLE 5-continued

Metal distribution of Arab light crude oil

| Fraction | Vanadium, ppmw | Nickel, ppmw |
|---|---|---|
| 371° C.+ | 36 | 10 |
| 427° C.+ | 43 | 12 |
| 482° C.+ | 57 | 17 |

As seen in Table 5, the metals are in the heavy fraction of the crude oil, which is commonly used as a fuel oil component or processed in residual hydroprocessing units. The metals must be removed during the refining operations to meet fuel burner specifications or prevent the deactivation of hydrodesulfurization catalysts downstream of the process units.

In a typical petroleum refinery, crude oil is first fractionated in an atmospheric distillation column to separate and recover sour gas and light hydrocarbons, including methane, ethane, propane, butanes and hydrogen sulfide, naphtha (36-180° C.), kerosene (180-240° C.), gas oil (240-370° C.), and atmospheric residue, which is the remaining hydrocarbon fraction boiling above 370° C. The atmospheric residue from the atmospheric distillation column is typically used either as fuel oil or sent to a vacuum distillation unit, depending on the configuration of the refinery. The principal products of vacuum distillation are vacuum gas oil, which comprises hydrocarbons boiling in the range 370-565° C., and the vacuum residue consisting of hydrocarbons boiling above 565° C. The metals in the crude oil fractions impact downstream process including hydrotreating, hydrocracking and FCC.

Naphtha, kerosene and gas oil streams derived from crude oils or from other natural sources such as shale oils, bitumens and tar sands, are treated to remove the contaminants, e.g., mainly sulfur, whose quantity exceeds specifications. Hydrotreating is the most common refining process technology employed to remove the contaminants. Vacuum gas oil is typically processed in a hydrocracking unit to produce naphtha and diesel or in a fluid catalytic cracking unit to produce gasoline, with LCO and HCO as by-products. The LCO) is typically used either as a blending component in a diesel pool or as fuel oil, while the HCO is typically sent directly to the fuel oil pool. There are several processing options for the vacuum residue fraction, including hydroprocessing, coking, visbreaking, gasification and solvent deasphalting.

Reduction in the amount of sulfur compounds in transportation fuels and other refined hydrocarbons is required in order to meet environmental concerns and regulations. Removal of contaminants depends on their molecular characteristics; therefore, detailed knowledge of the sulfur species in the feedstock and products is important for the optimization of any desulfurization process. Numerous analytical tools have been employed for sulfur compounds speciation. Gas chromatography (GC) with sulfur-specific detectors is routinely applied for crude oil fractions boiling up to 370° C. The use of ultra-high resolution Fourier transform ion cyclotron resonance (FT-ICR) mass spectrometry has recently been advanced as a powerful technique for the analysis of heavy petroleum fractions and whole crude oils. Use of this methodology is described in, e.g., Hughey. C. A., Rodgers, R. P., Marshall, A. G., Anal. Chem. 2002, 74, 4145-4149; Muller, H., Schrader, W., Andersson, J. T., Anal. Chem., 2005; 77, 2536-25431 and Choudhary, T. V. Malandra, J., Green J., Parrott, S., Johnson, B., Angew. Chem., Int. Ed. 2006, 45, 3299-3303.

From the above discussion, it is apparent that it would be desirable to upgrade crude oil by both removing specific undesirable metal compounds at an early stage of processing so that the demetalized stream can be desulfurized.

Various references in fact show the integration of processes for demetallizing a hydrocarbon feed stream and hydrodesulfurizing it. U.S. Pat. Nos. 5,045,177 and 4,481,101, e.g., both incorporated by reference, teach older processes for delayed coking of hydrocarbon feeds, especially residual oil, which is the feedstock of the current invention. No separate, catalytic desulfurization step is shown in these references.

U.S. Pat. No. 4,058,451, also incorporated by reference, teaches coking, followed by hydrodesulfurization ("HDS"). There is no mention of oxidative desulfurization ("ODS"). This is also the case for U.S. Pat. No. 3,617,481, which combines coking and HDS, but not ODS.

Published U.S. Application No. 2012/0055845 to Bourane, et al., now U.S. Pat. No. 9,574,143, also incorporated by reference, teaches ODS, as a separate process, not integrated with delayed coking of residual oil. Also see Published U.S. Application No. 2017/0190641 to Koscoglu et al., also incorporated by reference; Published U.S. Application No. 2018/0029023 to Koseoglu, et al., also incorporated by reference, (these published U.S. applications correspond to WO 2017 120130 and WO 2018 022596, respectively); U.S. Pat. Nos. 9,663,725; 9,598,647; 9,574,144; and 9,574,142, all incorporated by reference. Also see U.S. Pat. Nos. 9,464,241 and 9,062,259, and as well as Gao, et al., Energy & Fuels, 23:624-630 (2009). These references all discuss ODS processes using various catalysts and methodologies.

It is therefore a principal object of the present invention to provide a novel method of treating crude oil to substantially reduce the content of both undesired metal compounds and sulfur compounds in gas phase oxidative desulfurization, via an integrated process in which residual oil is subjected to delayed coking and oxidative desulfurization, optionally with additional steps, such as hydrodesulfurization and/or hydrocracking, which can be carried out before or after oxidative desulfurization, and are always carried out after the initial, delayed coking step.

SUMMARY OF THE INVENTION

The invention involves an integrated process for treating residual oil, where the residual oil is first demetalized, via delayed coking. The delayed coking produces gas, a demetalized oil, and coke. The gas is removed for further uses consonant with refinery practice, and the coke may be subject to further processing to yield hydrogen gas, which can be used for other purposes as well.

The demetallized oil is then subjected to oxidative desulfurization (ODS), to remove additional sulfur. An ODS catalyst and oxygen are added to the vessel with this liquid and a second gas, and a second liquid are produced.

The second gas contains inter alia, oxygen, which can be recycled to the ODS reaction. Additional gases can be stored, bled off, or used in additional processes.

The resulting second liquid contains a low enough level of sulfur, such that it can be used in some (HDS) applications "as is"; however, it can be subjected to hydrodesulfurization or hydrocracking, to reduce sulfur content even further. Each of these optional additional processes yield gas, including hydrogen. The resulting hydrogen can be recycled to the HDS or hydrocracking process.

It should be noted that the HDS process, referred to supra, may also be carried out prior to ODS, if desired.

BRIEF DESCRIPTION OF THE FIGURES

FIG. 1 shows schematically, the broadest embodiment of the invention.

FIG. 2 shows an embodiment of the invention in which hydrodesulfurization (HDS), follows the ODS step.

DETAILED DESCRIPTION OF PREFERRED EMBODIMENTS

Referring now to the figures, FIG. 1 shows the invention in its broadest embodiment. Residual fuel oil "1" is added to a first vessel "2," and treated under standard delayed coking conditions. The result is coke "3," which is separated for further processing, such as gasification. Also produced via the delayed coking are a liquid phase and a gas phase, which move to separation zone "4." Gases "5" are separated to a separate vessel "6," demetallized oil "7" precipitates from the delayed coking residual oil ("the first liquid") is moved to a second vessel "8" for gas phase ODS. A source of Oxygen "9" is provided to vessel "8," which contains an ODS catalyst. This liquid is subject to ODS, producing a second liquid and gas, which are separated from each other in separation zone "10." Gases are separated to zone "11," while the second liquid can now be used in other processes, such as being added to fuels.

The gas moved to zone "11" is voluminous. A portion of it is removed ("bled"), while any residual oxygen is recycled to the ODS phase.

FIG. 2 shows optional additional steps, which can be carried out in the second liquid product of FIG. 1. To elaborate, the desulfurized oil moves to a third vessel "12," for HDS. A source of hydrogen "13" is provided. Again, a liquid and a gas are formed, which are separated in separation zone "14." Again, a portion of the gas is removed after separation to zone "15," and residual hydrogen can be recycled to the HDS process.

Figure 3:
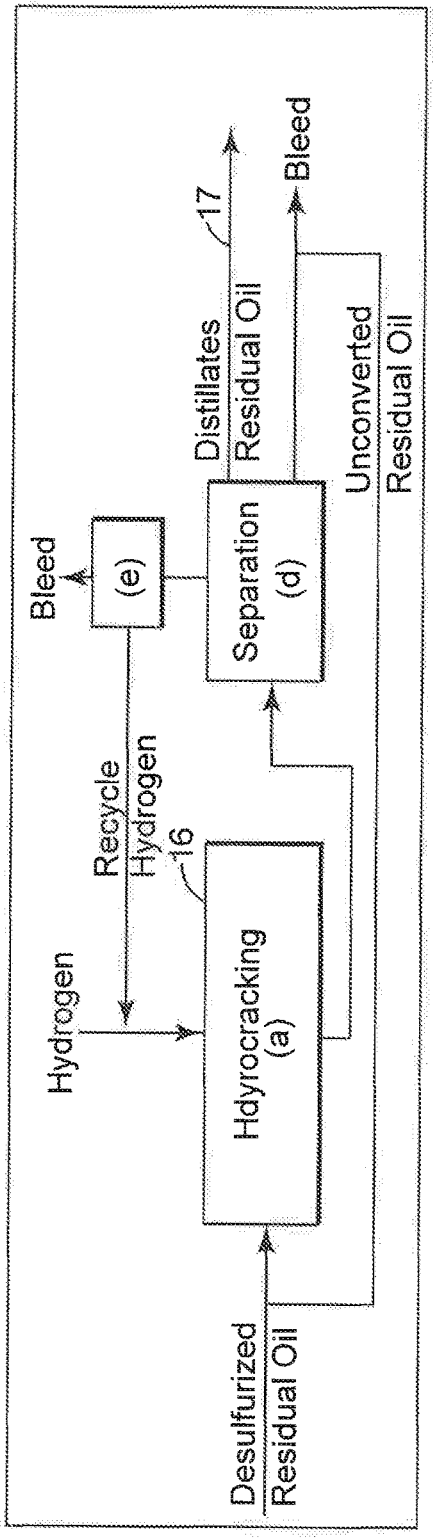
FIG. 3 shows an embodiment of the invention in which ODS is followed by hydrocracking.

In FIG. 3, an embodiment is shown where, rather than subjecting the product of ODS to HDS, it is hydrocracked, in the presence of hydrogen and hydrocracking catalysts. FIG. 3 shows hydrocracking vessel "16," and also illustrated as "17," is the distillate from the hydrocracked oil, previously subjected to ODS.

Figure 4:
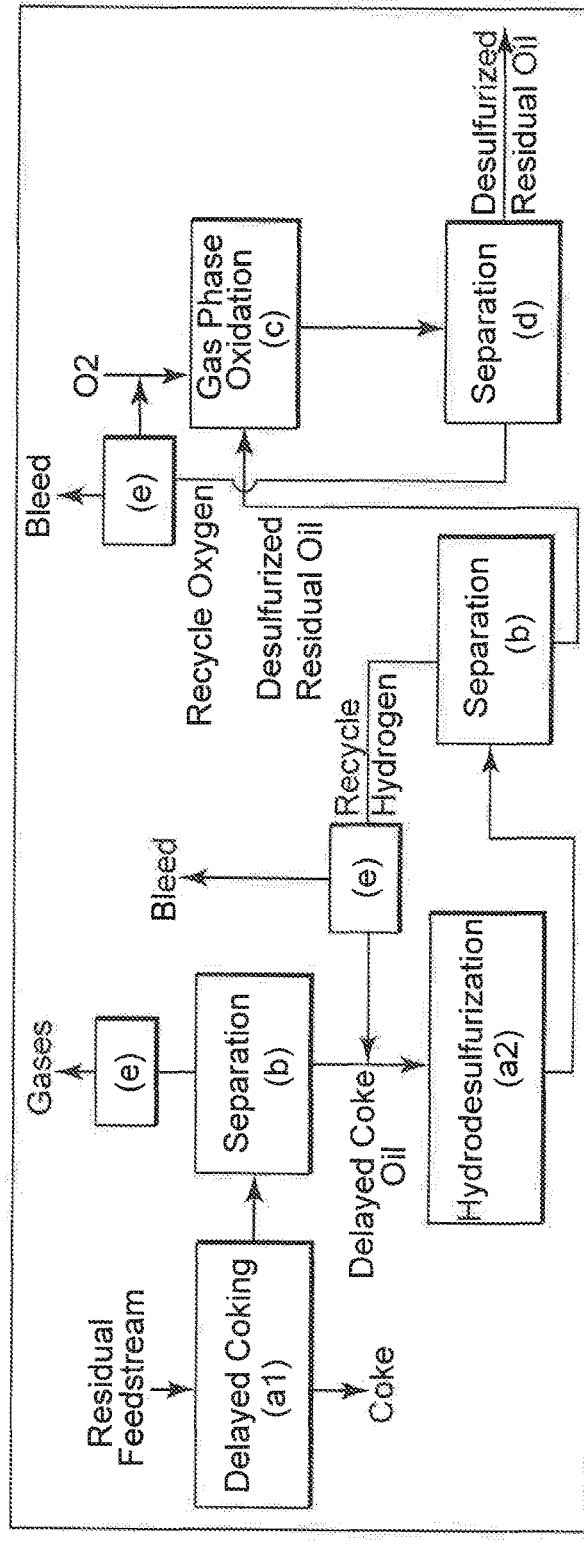
FIG. 4 shows an embodiment of the invention where an H-IDS step precedes the ODS step.

FIG. 4 shows an embodiment of the invention, where, intermediate to delayed coking, the coked oil is subjected to HDS, prior to ODS. It will be seen that all steps and apparatus are in fact the same as in FIGS. 1-3, but simply have had positions changed.

FIGS. 2 and 3 could logically, follow FIG. 4.

EXAMPLE

A demetalized oil sample was introduced into a first vessel which served as a coking unit. The coking took place at a temperature of 496° C., and atmospheric pressure. The demetalized oil had an API gravity of 14.10, sulfur content of 2.9 wt %, MCR of 7.32 wt %, IBP of 355° C., MBP of 614° C., 85° C. point of 690° C. and a sulfur content of 2.9 wt %.

Among the products of the coking step, was a liquid, which contained 2.37 wt % sulfur and coke, containing 6.6 wt % sulfur. The liquid was moved to a second vessel for ODS. The second vessel was a fluidized bed reactor, containing 1B+5MoO$_3$/CuZnAl catalyst. The ODS reaction took place at a temperature of 500° C., a pressure of 1 bar, weight liquid hourly space velocity of 6 h$^{-1}$, and an oxygen: sulfur atom ratio of 26.

The liquid which resulted from the delayed coking contained 2.37 wt % sulfur. Following ODS, the sulfur content was 1.26 wt %.

The foregoing description and examples set forth the invention, which is an integrated process for demetallization and desulfurization of the residual oil fraction of a hydrocarbon feedstock. This is accomplished by integrating a delayed coking step, and an oxidative desulfurization step. Optionally, this integrated process may include one or more hydrodesulfurization and/or hydrocracking steps. These optional steps are carried out in the presence of hydrogen and an appropriate catalyst or catalysts, as known in the art.

In practice, a residual oil hydrocarbon feedstock is introduced or contacted to a first vessel, together with a paraffinic alkyl solvent, such as propane, or any pure paraffinic solvent, preferably one or more C5-C8 alkanes, most preferably pentane, hexane, or a mixture of these in the form of, e.g., light naphtha, as well as mixture of these under conditions which may include the addition of hydrogen, to form a demetalized liquid fraction, a gas fraction, and coke.

The gas and coke fractions will be addressed infra; however, the liquid fraction, now with reduced metal and sulfur content is removed to a second vessel, where it is subjected to gas phase oxidative desulfurization, in presence of an oxidative desulfurization catalyst. The catalyst can be present in the form of, e.g., a fixed, ebullated, moving or fluidized bed. The gaseous phase "ODS" takes place at a temperature of from 300° C. to 600° C., preferably from 400° C.-550° C., and with an oxidative gas, such as pure oxygen, where a ratio of O$_2$ to sulfur (calculated in the liquid), is from 20-30, preferably 25-30.

Additional parameters of the reaction include a pressure of 1-20 bars, preferably 1-10 bars, and most preferably, 1-5 bars. A WHSV of 1-20 h$^{-1}$, preferably 5-10 h$^{-1}$, and a GHSV of from 1,000-20,000 h$^{-1}$, preferably 5-15,000 h$^{-1}$, and even more preferably, 5-10,000 h$^{-1}$ are used.

As noted, supra, during the delayed coking phase, coke is produced. The resulting coke can be removed and gasified, to produce hydrogen gas. The hydrogen gas can be returned to the first vessel or when an optional HDS or cracking step is used, be channeled to the vessels in which these reactions take place.

The gas produced via delayed coking is separated, and can be stored, separated into component fractions, or otherwise used in art known processes.

Prior to, or after the ODS step, the liquid may be hydrodesulfurized, using methods known in the art, using hydrogen and an H-IDS catalysts. Whether this HDS step is done before or after ODS, the resulting hydrocarbon product which results at the end of the process contains very low amounts to sulfur, and de minimis quantities of metals.

The product of ODS may also be hydrocracked, in the presence of hydrogen and hydrocracking catalysts, either before or after an optional HDS step, again resulting in a product with very low sulfur and metal content.

As noted, supra, a gaseous oxidizing agent, such as pure O$_2$, or air containing O$_2$, is added to the ODS vessel. The products of ODS are a liquid and a gas. The liquid, as discussed supra, can be used, e.g., as fuel oil. The gas is separated and oxygen can be recycled to the ODS vessel, if desired.

Various ODS catalysts useful in gaseous ODS are known. Preferred are catalysts which comprise oxides of copper, zinc, and aluminum, i.e.:

10-50 wt % CuO
5->20 wt % ZnO
20-70 wt % $Al_2O_3$ which also contain a highly dispersed spinel oxide phase. While the catalyst itself can be represented by the formula:

The aforementioned spinel phase is better represented by:

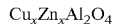

where x is from 0 to 1, preferably 0.1 to 0.6, and most preferably from 0.2 to 0.5.

The catalyst can be granular, or in forms such as a cylinder, a sphere, a trilobe, or a quatrolobe, with the granules having diameters ranging from 1 mm to 4 mm. The catalysts have a specific surface area of from 10 $m^2$/g to 100 $m^2$/g, more preferably 50 $m^2$/g to 100 $m^2$/g, pores from 8 to 12 nm, and most preferably 8 nm to 10 nm, and a total pore volume of from 0.1 $cm^3$/g to 0.5 $cm^3$/g.

In a more preferred embodiment, the composition is:
20-45 wt % CuO
10->20 wt % ZnO
20-70 wt % $Al_2O_3$
and even more preferably:
30-45 wt % CuO
12->20 wt % ZnO
20-40 wt % $Al_2O_3$.

Especially preferred are catalysts of the type described supra, containing a mixed oxide promoter, such as one or more oxides of Mo, W, Si, B, or P. The example used such a catalyst, with a mixture of Mo and B oxides.

The catalysts can be on a zeolite support, such as an H form zeolite, e.g., HZSM-5, HY, HX, H-mordenite, H-β, MF1, FAU, BEA, MOR, or FER. The H forms can be desilicated, and/or contain one or more transition metals, such as La or Y. When used, the H form zeolite is present at from 5-50 wt % of the catalyst composition, and a silicate module of from 2 to 90.

Other features of the invention will be clear to the skilled artisan and need not be reiterated here.

The terms and expression which have been employed are used as terms of description and not of limitation, and there is no intention in the use of such terms and expression of excluding any equivalents of the features shown and described or portions thereof, it being recognized that various modifications are possible within the scope of the invention.

I claim:

1. An integrated process for removing metals and sulfur from a residual oil feedstock, consisting of:
   (i) contacting said residual oil feedstock with a paraffinic solvent in a first vessel under delayed coking conditions, to produce a gas fraction, a residual oil fraction, and coke;
   (ii) moving said residual oil fraction and said gas fraction to a separation zone;
   (iii) in the separation zone, separating the gas fraction from the residual oil fraction, said residual oil fraction forming a demetallized bottoms fraction in the separation zone;
   (iv) moving said demetallized bottoms fraction to a second vessel, said second vessel containing an oxidative desulphurization (ODS) catalyst;
   (v) contacting said demetallized bottoms fraction and ODS catalyst with a gaseous oxidizing agent, to form $SO_2$, gaseous, and liquid products in a gaseous ODS process;
   (vi) separating said gaseous and liquid products produced in (v) from each other;
   (vii) removing a portion of said gaseous products from the total gaseous products, leaving a remainder;
   (viii) recycling said remainder to said second vessel; and
   (ix) removing any liquid products.

2. The process of claim 1, wherein said ODS catalyst is in the form of a fixed, ebullated, moving or fluidized bed.

3. The process of claim 1, wherein said demetallized bottoms fraction, ODS catalyst and gaseous oxidizing agent are contacted at a temperature of from 300° C. to 600° C.

4. The process of claim 3, wherein said temperature is 400° C.-550° C.

5. The process of claim 1, wherein said gaseous oxidizing agent is contacted with said demetallized bottoms fraction at an $O_2$/S ratio of from 20-30.

6. The process of claim 5, wherein said ratio is 25-30.

7. The process of claim 1, wherein said gaseous oxidizing agent, ODS catalyst and demetallized bottoms fraction are contacted at a pressure of from 1 bar-20 bars.

8. The process of claim 7, wherein said pressure is 1-10 bars.

9. The process of claim 1, wherein said pressure is 1-5 bars.

10. The process of claim 1, said demetallized bottoms fraction, ODS catalyst and gaseous oxidizing agent are contacted at a WHSV of 1-20 $h^{-1}$.

11. The process of claim 10, wherein said WHSV is 5-10 $h^{-1}$.

12. The process of claim 1, said demetallized bottoms fraction, ODS catalyst, and gaseous oxidizing agent are contacted at a GHSV of 1,000-20,000 $h^{-1}$.

13. The process of claim 12, wherein said GHSV is 5,000-15,000 $h^{-1}$.

14. The process of claim 13, wherein said GHSV is 5,000-10,000 $h^{-1}$.

15. An integrated process for removing metals and sulfur from a residual oil feedstock, consisting of:
   (i) contacting said residual oil feedstock with a paraffinic solvent in a first vessel under delayed coking conditions, to produce a gas fraction, a residual oil fraction, and coke;
   (ii) moving said residual oil fraction and said gas fraction to a separation zone;
   (iii) in the separation zone, separating the gas fraction from the residual oil fraction; said residual oil fraction forming a demetallized bottoms fraction in the separation zone
   (iv) moving said demetallized bottoms fraction to a second vessel, said second vessel containing an oxidative desulphurization (ODS) catalyst;
   (v) contacting said demetallized bottoms fraction and ODS catalyst with a gaseous oxidizing agent, to form $SO_2$, gaseous, and liquid products in a gaseous ODS process;
   (vi) separating said gaseous and liquid products produced in (v) from each other;
   (vii) removing a portion of said gaseous products from the total gaseous products, leaving a remainder;
   (viii) recycling said remainder to said second vessel;

(ix) removing any liquid products; and
(x) gasifying said coke to produce hydrogen.

16. An integrated process for removing metals and sulfur from a residual oil feedstock, consisting of:
(i) contacting said residual oil feedstock with a paraffinic solvent in a first vessel under delayed coking conditions, to produce a gas fraction, a residual oil fraction and coke;
(ii) moving said residual oil fraction and said gas fraction to a separation zone;
(iii) in the separation zone, separating the gas fraction from the residual oil fraction, said residual oil fraction forming a demetallized bottoms fraction in the separation zone;
(iv) subjecting said demetallized bottoms fraction to hydrocracking in the presence of hydrogen and hydrocracking catalysts;
(v) moving said demetallized bottoms fraction to a second vessel, said second vessel containing an oxidative desulphurization (ODS) catalyst;
(vi) contacting said demetallized bottoms fraction and ODS catalyst with a gaseous oxidizing agent, to form $SO_2$, gaseous, and liquid products in a gaseous ODS process;
(vii) separating said gaseous and liquid products produced in (vi) from each other;
(viii) removing a portion of said gaseous products from the total gaseous products, leaving a remainder;
(ix) recycling said remainder to said second vessel;
(x) removing any liquid products; and
(xi) subjecting the demetallized oil fraction of (iv) to hydrocracking in the presence of hydrogen and hydrocracking catalysts before (v).

\* \* \* \* \*